Jan. 20, 1970  I. G. BRADLEY  3,490,731
BUSHING INSULATOR MOLDING DEVICE
Original Filed May 1, 1967  2 Sheets-Sheet 1
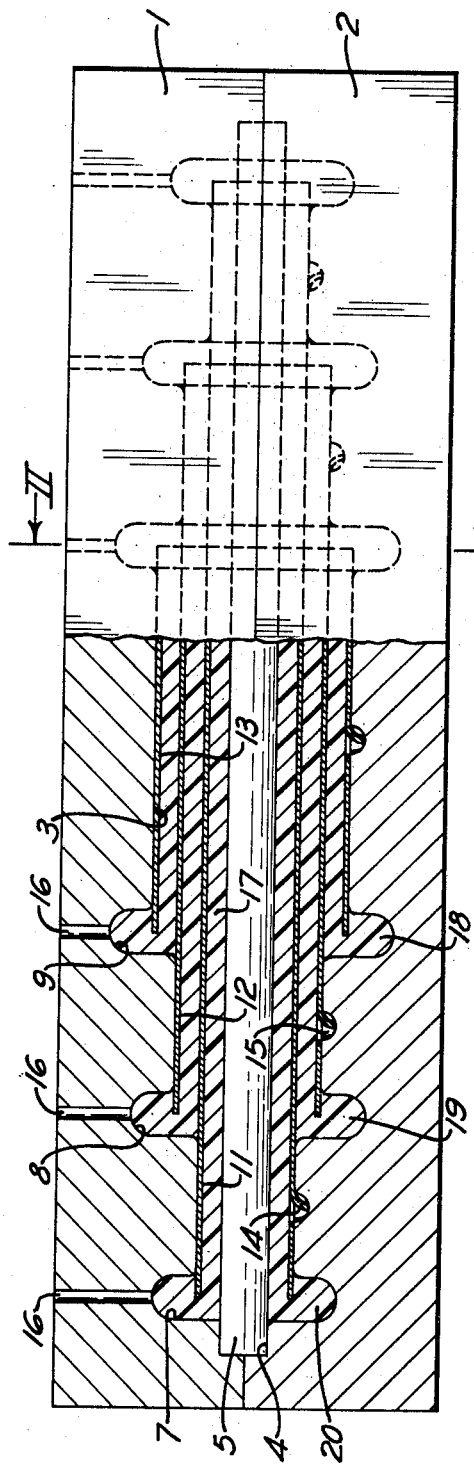
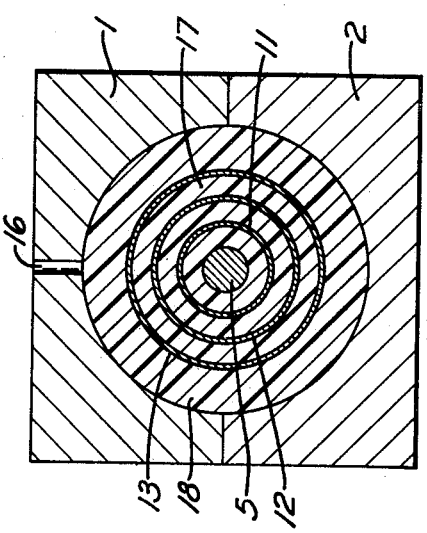
INVENTOR.
IAN G. BRADLEY
BY
Brown, Critchlow, Flick & Peckham
ATTORNEYS.

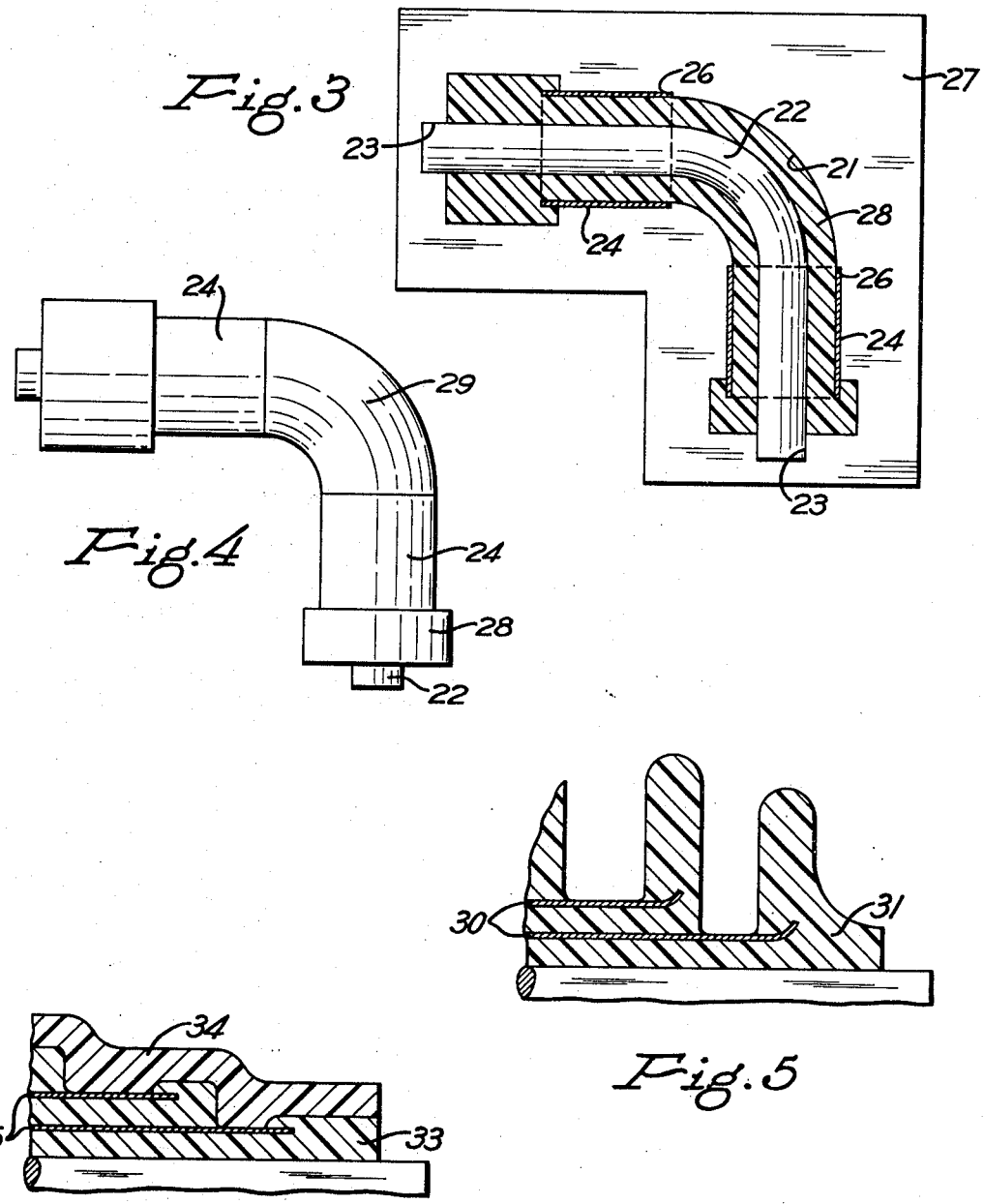

United States Patent Office 3,490,731
Patented Jan. 20, 1970

3,490,731
BUSHING INSULATOR MOLDING DEVICE
Ian G. Bradley, Gloucester, England, assignor to Permali Incorporated, Mount Pleasant, Pa., a corporation of New York
Continuation of application Ser. No. 635,039, May 1, 1967. This application Mar. 26, 1969, Ser. No. 814,508
Int. Cl. B32b 15/08; H01b 13/06, 17/28
U.S. Cl. 249—95          2 Claims

ABSTRACT OF THE DISCLOSURE

A mold is provided with an elongated cavity having an annular recess in each end of its side wall, and two or more pairs of such recesses between the end pair. The central portion of the cavity has the largest diameter, and the diameter, is stepped down at the recesses as the ends of the cavity are approached. Radially spaced concentric metal sleeves are disposed in the mold in engagement with the cavity side wall, with the ends of each sleeve extending only part way across the annular recesses at those ends. The mold is then filled with settable insulating material to form a bushing insulator.

This application is a continuation of my copending patent application Ser. No. 635,039, filed May 1, 1967, now abandoned.

Background of the invention

Bushing insulators are used where electrical conductors have to pass through the walls of transformers, circuit breaker housings, etc. In order to relieve the stress on the insulating material, electrically conductive elements in the form of coatings or thin metal sheets or thin wall metal sleeves are often incorporated in these insulators to form condensers that smooth out the stress gradient from the conductor at the center of the bushing to the outer surface of the bushing. In plasticized paper bushings, one or more metal sheets have been included during the wrapping process. In general, the sheets are grounded. Metal sleeves are used in the production of cast resin insulators, which may include sleeves near the outer surface and between that surface and the center of the bushing. However, the positioning of such sleeves in a cast resin insulator is much more difficult than building metal sheets into a plasticized paper bushing, because it is difficult to position the sleeves correctly in an empty mold that is to be filled by resin at a later stage. Another method has been to cover a portion of the outer surface of the finished resin body with conductive paint or a sprayed metallized layer, which can be grounded by connection to adjacent metal parts. This construction is not ideal because the ends of the layer are heavily electrically stressed and are not molded into the insulating body but are covered by a subsequent painting or molding operation. It is much better that the ends of the conductive element be below the surface of the insulator body, where the heavy electrical stresses associated with the ends are less serious.

It is an object of this invention to provide a molding device for forming settable insulating material into an insulating body of predetermined shape. Another object is to provide such a device, in which two or more condenser elements are positioned so that their ends are embedded in insulating material but their intermediate areas engage the surrounding mold.

The invention is illustrated in the accompanying drawings, in which:

FIG. 1 is a side view, partly in section, of a mold containing a bushing insulator;

FIG. 2 is a cross section taken on the line II—II of FIG. 1;

FIG. 3 is a plan view of the lower half of a modified mold, showing a partly formed insulator therein in horizontal section;

FIG. 4 is a plan view of the finished modified insulator; and

FIGS. 5 and 6 are fragmentary longitudinal sections of two further modifications of the invention.

Referring to FIGS. 1 and 2 of the drawings, a two-part mold 1 and 2 is provided with a central elongated cavity 3 having the same shape as the bushing insulator to be made in it. The ends of the cavity are provided with a pair of shallow aligned bores 4, in which fit the ends of a straight electrical conductor 5. The bores support the conductor in the center of the cavity, which is concentric with the conductor. The conductor usually will be round, so the molding cavity likewise is round. The side wall of the cavity is provided with at least one pair of longitudinally spaced annular recesses. The drawing shows three pairs 7, 8 and 9 of such recesses, each pair having inner and outer diameters that are different from those of the other pairs. That is, the recesses 7 at the ends of the cavity have the smallest diameter while those nearest the center have the largest.

With three pairs of recesses, the mold cavity has three different diameters. The side wall of the cavity between the two large center recesses 9 is cylindrical, as are also the areas of the side wall between the center recesses and the intermediate recesses 8 and the areas between the end recesses and the intermediate recesses. The diameter of the mold cavity is smallest between the end recesses and the intermediate recesses, while it is largest between the two inner recesses. In other words, the diameter of the cavity is stepped down from its central portion toward each end.

To mold an insulator in this mold, three tubular electrically conductive elements or sleeves 11, 12, and 13, made of thin solid or perforated metal or of metal gauze, are placed inside of one another. The electrical conductor 5 is placed inside of the inner sleeve. The inner sleeve is the longest, although shorter than the conductor, and th outer sleeve is the shortest. The three sleeves vary considerably in diameter relative to one another and the conductor. The assembly of sleeves and conductor then is lowered into the bottom half of the open mold, so that the ends of the conductor are seated in the lower halves of bores 4 at the opposite ends of the cavity. The short outer sleeve 13 is of a size that will fit against the concave side wall of the cavity between the two center recesses 9. Spaced portions of the intermediate sleeve 12 near its ends will rest on the cavity side wall between the intermediate recesses and the center recesses, and the end portions of the long inner sleeve 11 will rest on the cavity side wall between the end recesses and the intermediate recesses. Each of these sleeves is slightly longer than the wall on which it rests, so that when a sleeve is centered lengthwise of the mold cavity, the ends of the sleeve will project part way across the adjoining recesses. To aid in centering the sleeves and keeping them from moving lengthwise out of position, each of them may be provided with one or more detents or struckout tongues 14 that project into small depression 15 in the side wall the side wall of the cavity.

After the conductor and sleeves have been placed in the lower half of the mold in the manner just explained, the upper half of the mold is seated on the lower half. The different semi-cylindrical areas of the side wall of the cavity in the upper half of the mold will fit over and engage the adjoining surfaces of the corresponding sleeves as shown. The result is that the three sleeves are locked in predetermined radially spaced concentric positions within the mold cavity. The upper half of the mold is provided with vertical passages 16 opening into recesses 7, 8 and 9 so that suitable insulating material in fluid form can be introduced into the mold cavity. This material may be an epoxy resin, a polyester, nylon, silicon rubber or other casting resin that will set and harden in the mold. Or, the material can be a suitable thermosetting resin that is injected into the cavity through the inlet passages. In any case, the material 17 will fill the cavity and the encircling annular recesses and in doing so will surround the central portions of the inner and intermediate sleeves and also surround and embed all of the sleeve ends projecting into the annular recesses. Of course, the electrical conductor extending through the center of the insulator will be surrounded by the insulating material too.

After the insulating material has set or been cured to form a solid body, the mold is opened and that the finished insulator removed from it. It will be seen that the outer surface of the outer sleeve 13 between the annular ribs 18 of the insulator body is exposed because it engaged the side wall of the mold cavity. Likewise, the outer surface of the intermediate sleeve 12 between the central ribs and the intermediate ribs 19 is exposed for the same reason, as is also the outer surface of the inner sleeve 11 between the intermediate and outer ribs 20 of the insulator. The positioning tongues 14 can be removed. The three sleeves are concentric with the insulator body, and all of their ends are embedded in it.

Lighter material can be used for the sleeves than heretofore, because they are firmly supported in the mold by the wall of the mold cavity surrounding them. This support also reduced the risk of mechanical damage to the sleeves during introduction of the molding material. The mechanical stresses caused by the presence of the sleeves when the resin sets and contracts are kept to a minimum. The sleeves in the finished bushing may easily be inspected visually, whereas if the sleeves were totally embedded in the insulation more expensive inspection techniques, such as X-ray etc., would have to be adopted.

An angular insulator can be made in the same general way, as illustrated in FIGS. 3 and 4. In this case the mold cavity 21 has end portions disposed at right angles to each other and connected by a curved central section. The outer ends of the cavity are of larger diameter than the adjoining straight portions, and the curved central portion is slightly smaller. The opposite ends of an angular conductor 22 are seated in shallow bores 23 at opposite ends of the cavity, and the straight end portions of the conductor are surrounded by short metal sleeves 24 that fit against the straight side wall of the cavity. The inner ends of the sleeves engage shoulders 26 at the ends of the curved central section of the cavity, while the outer ends of the sleeves project a short distance into the enlarged ends of the cavity. After the top section of the mold has been seated on the lower section 27, the cavity is filled with insulating material 28 to surround the conductor therein and to also surround and embed the outer ends of the two sleeves. After the insulator has been removed from the mold, the curved central section of the insulating material between the two metal sleeves is coated with an electrically conductive material 29, such as zinc or colloidal graphite or the like, as shown in FIG. 4. If desired, a metallic substance can be sprayed onto the insulation. This conductive layer engages the inner ends of the two metal sleeves to complete the tubular conductive element, the opposite ends of which are embedded in the insulator body.

Another form of insulator is shown in FIG. 5. It is made in the same general way as the one shown in FIG. 1. It includes two or more metal sleeves 30 having exposed areas that engaged the wall of the mold cavity in which it was formed. The ends of the sleeves are embedded in the insulator body 31 where its diameter is greater than the diameters of the sleeves. These ends may be belled as shown, in order to conform more favorably with the lines of stress of the electrical field in the dielectric medium.

In the modification shown in FIG. 6, the body 33 of the insulator is encapsulated in a suitable resinous shell 34 that engages the areas of the metal sleeves 35 that fitted against the wall of a mold cavity when the insulator was molded.

I claim:
1. A bushing insulator mold provided with an elongated cavity having spaced from its ends a pair of longitudinally spaced annular recesses in its side wall, the portion of said side wall between said recesses being formed to engage the outside of an electrically conductive sleeve to position it in the mold with its ends projecting only part way across said recesses, said cavity having a portion between each end of the mold and the adjacent one of said recesses of smaller diameter than the portion between said recesses, the outer end of each of said smaller cavity portions being surrounded by an annular recess and being formed to engage the outside of the end portions of a second electrically conductive sleeve to position it concentrically in said cavity with its ends projecting only part way across said last-mentioned recesses, the mold being provided with filling passages to permit said cavity and recesses to be filled with settable insulating material.

2. A bushing insulator mold according to claim 1, in which said cavity side wall is provided with depressions for receiving lateral projections on said sleeves to locate them in predetermined positions lengthwise of said cavity.

References Cited

UNITED STATES PATENTS

| | | | |
|---|---|---|---|
| 2,107,009 | 2/1938 | Mahle | 249—96 |
| 2,845,657 | 8/1958 | Beare. | |
| 3,355,772 | 12/1967 | Kolberg | 249—96 X |
| 3,383,446 | 5/1968 | Brennecke | 18—36 X |
| 3,394,455 | 7/1968 | Grimmer | 264—272 X |

FOREIGN PATENTS

| | | |
|---|---|---|
| 1,018,071 | 1/1966 | Great Britain. |

J. HOWARD FLINT, JR., Primary Examiner

U.S. Cl. X.R.

29—624, 631; 174—143; 264—272